US006207737B1

(12) United States Patent
Schell et al.

(10) Patent No.: US 6,207,737 B1
(45) Date of Patent: Mar. 27, 2001

(54) GLASS FIBER SIZING, SIZED GLASS FIBERS AND POLYOLEFIN REINFORCED ARTICLES

(75) Inventors: Philip L. Schell, Assen; Laura A. Meesters, Den Andel, both of (NL); Rajgopal Subramanian, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 08/388,782

(22) Filed: Feb. 15, 1995

Related U.S. Application Data

(63) Continuation-in-part of application No. 08/212,539, filed on Mar. 14, 1994, now abandoned.

(51) Int. Cl.[7] .................................................. C08K 5/51

(52) U.S. Cl. .................. 524/130; 524/132; 524/133; 524/135; 524/148; 524/261; 524/262; 524/267; 524/414; 524/417; 524/418; 524/419

(58) Field of Search ............................ 524/414, 417, 524/418, 419, 130, 132, 133, 135, 148, 261, 262, 267

(56) References Cited

U.S. PATENT DOCUMENTS

| 3,169,884 | 2/1965 | Marzocch .............................. 117/126 |
| 3,252,825 | 5/1966 | Marzocchi et al. ................... 117/126 |
| 3,416,945 | 12/1968 | Zweidler et al. .................... 117/33.5 |
| 3,416,990 | 12/1968 | Robinson .............................. 161/93 |
| 3,437,550 | 4/1969 | Paul, Jr. ................................. 161/93 |
| 3,483,276 | 12/1969 | Mahlman ............................. 260/897 |
| 3,816,235 | 6/1974 | Lin ....................................... 161/175 |
| 3,920,596 | 11/1975 | Furukawa et al. ................. 260/22 R |
| 3,968,068 | 7/1976 | Haggerty ....................... 260/29.6 RB |
| 4,248,935 | 2/1981 | Temple ................................. 428/391 |
| 4,295,871 | 10/1981 | Droux et al. .......................... 65/3.41 |
| 4,341,677 | 7/1982 | Tamosauskas ....................... 523/421 |
| 4,457,970 | 7/1984 | Das et al. .............................. 428/290 |
| 4,483,948 | 11/1984 | Tamosauskas ....................... 523/205 |
| 4,637,956 | 1/1987 | Das et al. .............................. 428/391 |
| 4,728,573 | 3/1988 | Temple ................................. 428/378 |
| 4,898,616 | 2/1990 | Hyche et al. ......................... 106/271 |
| 4,960,644 | 10/1990 | Hyche et al. ......................... 428/407 |
| 4,975,120 | 12/1990 | Hyche et al. ......................... 106/271 |
| 5,007,961 | 4/1991 | Hyche et al. ........................... 106/18 |
| 5,024,890 | 6/1991 | Pollet et al. .......................... 428/372 |
| 5,096,493 | 3/1992 | Hyche et al. ......................... 106/271 |
| 5,130,197 | * 7/1992 | Temple ................................. 428/378 |
| 5,130,198 | * 7/1992 | Swisher et al. ...................... 428/391 |
| 5,190,579 | 3/1993 | Gose et al. ............................. 106/18 |
| 5,199,098 | 3/1993 | Nolan et al. ......................... 385/128 |
| 5,244,948 | 9/1993 | Mulhaupt et al. ..................... 524/99 |
| 5,247,004 | 9/1993 | Swisher et al. ...................... 524/494 |
| 5,278,210 | 1/1994 | Morimi et al. ....................... 524/100 |
| 5,318,990 | 6/1994 | Strauss ................................. 524/549 |
| 5,334,644 | 8/1994 | Gose et al. ........................... 524/487 |

FOREIGN PATENT DOCUMENTS

| 4129448 | 3/1993 | (DE) . |
| 0197351 | 9/1989 | (EP) . |
| 0356655 | 3/1990 | (EP) . |

(List continued on next page.)

OTHER PUBLICATIONS

*The Manufacturing Technology of Continuous Glass Fibres*, K. L. Loewenstein, Second Edition, 1983, p. 29.
"Vitamins (Vitamin A)", *Kirk–Othmer Encyclopedia of Chemical Technology*, Second Edition, vol. 21, John Wiley & Sons, Inc., 1970, p. 494.
"Polyethylene and Wax Emulsions", Chemical Corporation of America, Technical Bulletin and MSDS and data sheet for Poly Emulsion 43C30.

(List continued on next page.)

*Primary Examiner*—Edward J. Cain
(74) *Attorney, Agent, or Firm*—Linda Pingitore

(57) ABSTRACT

An aqueous sizing composition for glass fibers used to reinforce polyolefin polymers contains coupling agent, chemically modified polyolefin film forming material, and stabilizer. The stabilizer is one or more of the following:

i) phosphinates selected from the group consisting of alkali metal phosphinates, alkaline earth metal phosphinates, ammonium phosphinate, organic phosphinates and mixtures thereof;

ii) phosphonites selected from the group consisting of alkali metal phosphonites, alkaline earth metal phosphonites, ammonium phosphonite, organic phosphonites and mixtures thereof;

iii) phosphites selected from the group consisting of alkali metal phosphites, alkaline earth metal phosphites, ammonium phosphite, organic phosphites and mixtures thereof;

iv) hypophosphites selected from the group consisting of alkali metal hypophosphites, alkaline earth metal hypophosphites, ammonium hypophosphite and mixtures thereof;

v) sulfites selected from the group consisting of alkali metal sulfites, alkaline earth metal sulfites, ammonium sulfite and mixtures thereof.

vi) bisulfites selected from the group consisting of alkali metal bisulfites, alkaline earth metal bisulfites, ammonium bisulfite and mixtures thereof; and vii) mixture of one or more of the stabilizers of i through vi with an antioxidant selected from the group consisting of hindered phenols, diarylamines, thioethers and mixtures thereof, Optionally the size contains as a lubricant one or more partial esters of a branched carboxylic acid copolymer present.

Sized glass fibers prepared with the aforesaid sizing composition result in improved color and mechanical properties in polyolefin composites reinforced with the sized fibers.

24 Claims, No Drawings

FOREIGN PATENT DOCUMENTS

| | | |
|---|---|---|
| 0381125 A2 | 8/1990 | (EP). |
| 0548930 | 6/1993 | (EP). |
| 55149147 | 11/1980 | (JP). |
| 3-262185 | 11/1991 | (JP). |
| 5-65537 | 9/1993 | (JP). |
| 6-4720 | 1/1994 | (JP). |
| 62-10139 | 8/1994 | (JP). |

OTHER PUBLICATIONS

"Special Effect Pigments", *Color of Plastics, Theory and Practice,* Mukhtar Ahmed, pp. 49–71, Van Nostrand Reinhold Co., 1979.

"Brighteners, Fluorescent", *Encyclopedia of Chemical Technology,* vol. 4, John Wiley and Sons, 1978, pp. 213–226.

"Fluorescent Whitening Agents", K. Berger, *Gachter/Muller Plastics Additives,* 3rd edition, pp. 775–789.

"Eastobrite OB–1 Optical Brightener for Plastics", *Polymer Additives and Specialty Monomers,* p. 1.

"Epolene Waxes For the Plastics Industry", *Polymer Additives and Specialty Monomers,* Eastman Chemical Co., pp. 1–3.

"Fluorescent Whitening Agent for Plastics and Coatings", Uvitex® OB, Ciba Geigy.

"Antioxidants for Polyolefins", Ciba–Geigy Technical Bulletin.

"Antioxidants", Chester C. Swasey, *Plastics Additives and Modifiers Handbook,* 1992, Van Nostrand Reinhold, pp. 193–207.

"Antioxidants", Dr. F. Gugumus, *Plastics Additives Handbook, stabilizers, Processing Aids, Plasticizers, Fillers, Reinforcements, Colorants for Thermoplastics,* 3rd edition, edited by R. Gachter and H. Muller, Hanser Publishers, pp. 1–13, 38–49, 96–99.

U.S. application No. 08/185,647, filed Jan. 24, 1994 entitled "Chemical Treatment for Reinforcing Materials for Polymeric Matrices and the Treated Reinforcing Materials and Method" by Rajgopal Subramanian et al.

U.S. application No. 08/007,407, filed Jan. 22, 1993 entitled "Chemical Treatment for Fibers and Reinforcement for Polymer Matrices Resulting in Good Solvent Resistance", by Robert G. Swisher et al.

\* cited by examiner

GLASS FIBER SIZING, SIZED GLASS FIBERS AND POLYOLEFIN REINFORCED ARTICLES

CROSS REFERENCE TO RELATED APPLICATIONS

This application is a continuation-in-part of U.S. Ser. No. 08/212,539, filed Mar. 14, 1994, now abandoned entitled "Glass Fiber Sizing and Sized Glass Fibers and Polyolefin Reinforcing Articles". This application is related to U.S. Ser. No. 08/388,959, filed even date herewith, entitled, "Aqueous Sizing Composition for Glass Fibers Providing Improved Whiteness in Glass Fiber Reinforced Plastics".

BACKGROUND OF THE INVENTION

The present invention is directed to chemically treated glass fibers, strands or yarn where the fibers impart improved strength in reinforcing thermoplastics and in particular polyolefins.

Glass fibers are produced by flowing molten glass via gravity through a multitude of small openings in a precious metal device, called a bushing. Typical formulations of glass fibers are disclosed in *The Manufacturing Technology of Continuous Glass Fibres*, Library of Congress Catalog Card Number 72-97429, by K. L. Loewenstein, Elsevier Scientific Publishing, 1973, at page 29. Glass fibers are, for example, those known as "E glass", "S glass", "D glass" and are typically between 3 and 30 microns in diameter.

After the fibers have cooled very shortly after their issuance from the bushing and usually in close proximity to the bushing, these fibers are treated with a chemical treating formulation usually referred to in the art as a sizing composition or size. The size serves to make the fibers more compatible with the material they will ultimately be used to reinforce and to make the fibers more easy to process. The aqueous size can be applied by sprayers, rollers, belts, metering devices or any similar application device. The sized glass fibers are gathered into bundles or strands comprising a plurality of individual fibers, generally from 200 to more than 3000. The sized glass fibers generally can have between about 0.01 and 5 percent of sizing composition based on the weight of the glass fiber.

After their formation and treatment, the strands can be wound into a spool or "forming package" and/or may be chopped. The forming packages or chopped strands are usually dried in either an oven or at room temperature to remove some of the moisture from the fibers.

The strands of treated fibers can be used to reinforce various materials such as thermoplastic polymers. Thermoplastics can be of different types, including chemically coupled and non-chemically coupled polyalkylenes such as polypropylenes and particular types of strands of sized fibers have generally been directed to reinforcement of either of these thermoplastics.

U.S. Pat. No. 5,130,197 to Temple teaches a sizing having 1) an amino-silane coupling agent, 2) a carboxylic modified polyolefin resin, 3) an epoxy, urethane, or polyester resin or copolymer thereof, and 4) a binder stabilizer. These sized fibers are preferably used to reinforce non-chemically coupled polypropylene homopolymer. Also U.S. Pat. No. 4,341,677 to Tamosauskas teaches a size having a film forming polymer, coupling agent and an oil-in-water emulsion of an antioxidant like hindered phenols and diarylamines.

The fiber reinforced plastic industry continues to search for improvements in mechanical properties both initially and upon heat aging.

It would be beneficial, therefore, to provide chemically treated or sized fibers, strands and bundles thereof resulting in improved initial mechanical strength and/or improved mechanical strength retention and/or color on heat aging when used to reinforce for example, chemically coupled polypropylene, non-chemically coupled polypropylene and mixtures of these.

SUMMARY OF THE INVENTION

In accordance with the present invention, there is provided an aqueous sizing composition for glass fibers. The sizing composition comprises:

a) a coupling agent;
b) a chemically modified polyolefin film forming material;
c) a stabilizer selected from the group consisting of:
   i) phosphinates selected from the group consisting of alkali metal phosphinates, alkaline earth metal phosphinates, ammonium phosphinate, organic phosphinates and mixtures thereof;
   ii) phosphonites selected from the group consisting of alkali metal phosphonites, alkaline earth metal phosphonites, ammonium phosphonite, organic phosphonites and mixtures thereof;
   iii) phosphites selected from the group consisting of alkali metal phosphites, alkaline earth metal phosphites, ammonium phosphite, organic phosphites and mixtures thereof;
   iv) hypophosphites selected from the group consisting of alkali metal hypophosphites, alkaline earth metal hypophosphites, ammonium hypophosphite and mixtures thereof;
   v) sulfites selected from the group consisting of alkali metal sulfites, alkaline earth metal sulfites, ammonium sulfite and mixtures thereof;
   vi) bisulfites selected from the group consisting of alkali metal bisulfites, alkaline earth metal bisulfites, ammonium bisulfite and mixtures thereof; and
   vii) mixture of one or more of the stabilizers of i through vi with an antioxidant selected from the group consisting of hindered phenols, diarylamines, thioethers and mixtures thereof.

Also provided are a plurality of glass fibers having said sizing composition applied thereon as well as polyolefin composites reinforced with said sized glass fibers.

DETAILED DESCRIPTION OF THE INVENTION

The aqueous sizing composition of the present invention contains, in addition to water as a carrier, a coupling agent, a chemically modified polyolefin film forming material and, stabilizer effective against oxidizing phenomena. That is, the material is effective to deter oxidation of the matrix polymer to which sized glass fibers are added as reinforcement as well as the coupling agent. Particular types of stabilizers that can act as antioxidants provide particular benefits to thermoplastic polymers such as polyolefins, polyamides, and polyesters (polybutylene terephalate, PBT, and polyethylene terephthalate, PET) that are reinforced with glass fibers. These water emulsifiable, dispersible, or soluble stabilizers include inorganic and organic, phosphinates (or termed phosphonites depending upon the valance), phosphites, hypophosphites, sulfites and bisulfites. These can be used alone or in mixtures with each other or in mixtures with any other emulsifiable, dispersible, or soluble antioxidant that is known to those skilled in the art for use with coatings and films on discrete surfaces such as fibers. For instance, the antioxidants of U.S. Pat. Nos. 4,483,948; and 4,341,677 can be used and these patents are hereby incorporated by reference. Examples of these other types of antioxidants include hindered phenols, diarylamines, thiothers, and the like. More particularly, the stabilizer for use in the present invention can be selected from:

i) phosphinates selected from the group consisting of alkali metal phosphinates, alkaline earth metal phosphinates, ammonium phosphinate, organic phosphinates and mixtures thereof;

ii) phosphonites selected from the group consisting of alkali metal phosphonites, alkaline earth metal phosphonites, ammonium phosphonite, organic phosphonites and mixtures thereof;

iii) phosphites selected from the group consisting of alkali metal phosphites, alkaline earth metal phosphites, ammonium phosphite, organic phosphites and mixtures thereof;

iv) hypophosphites selected from the group consisting of alkali metal hypophosphites, alkaline earth metal hypophosphites, ammonium hypophosphite and mixtures thereof;

v) sulfites selected from the group consisting of alkali metal sulfites, alkaline earth metal sulfites, ammonium sulfite and mixtures thereof;

vi) bisulfites selected from the group consisting of alkali metal bisulfites, alkaline earth metal bisulfites, ammonium bisulfite and mixtures thereof; and vii) mixture of one or more of the stabilizers of i through vi with an antioxidant selected from the group consisting of hindered phenols, diarylamines, thioethers and mixtures thereof.

Sodium, potassium and lanthanum are exemplary of alkali metals and alkaline earth metal, respectively for the above stabilizes.

In one embodiment, an alkali metal phosphinate stabilizer is used which is an alkali metal phenyl phosphinate, an example of which is sodium benzene phosphinate. This material is used in amounts as generally disclosed hereinafter, although greater amounts can be used if additional benefits are required. An example of a commercially available sodium benzene phosphinate is that available from Stauffer Chemical Company having the formula $C_6H_6O_2PNa$ with a formula weight of 164.

Examples of organic phosphite antioxidant-type stabilizers include diisodecyl pentaerythritol phosphite, trialkyl phosphites, like triisodecyl phosphite, tristearyl phosphite, trimethyl phosphite, tris-(2,4-di-tert-butyl-phenol) phosphite, tris-(2,4-dimethylphenol)phosphite, alkylphenyl phosphites like isooctyl diphenyl phosphite, diisooctyl phenyl phosphite, hindered type organic phosphites like phosphorous acid cyclic neopentanetetrayl dioctadecyl ester, phosphorous acid and phosphorous cyclic neopentanetetrayl bis (alkylbutylphenyl) ester, and others as described in U.S. Pat. No. 5,278,210 hereby incorporated by reference. A suitable example is Irgafos 168 which is tetrakis(2,4-di-tert-butylphenyl)4,4'-biphenylylendiphosphite. An example of an organic phosphinate stabilizer is sodium benzene phosphinate, mentioned above.

The preferred stabilizers are the water soluble inorganic hypophosphites, preferably the alkali metal hypophosphites including sodium and potassium hypophosphite. Most preferably sodium hypophosphite is the sole stabilizer present in a preferred amount of from about 2 to about 10 weight percent, the percentages based on the total solids of the aqueous sizing composition. A suitable sodium hypophosphite is that available from Fisher Scientific Company as solid sodium hypophosphite having the formula $NaH_2PO_2 \cdot H_2O$. This material is water soluble and can be dissolved into the aqueous sizing composition directly or predissolved and then added. Preferably the sodium hypophosphite is predissolved in water and then added to the sizing composition.. An effective stabilizing amount of the stabilizer is one which improves the mechanical properties of the glass fiber reinforced and/or siliceous filled thermoplastic polymeric matrix.

The stabilizer is generally present in the claimed sizing composition in an amount ranging from about 1 weight percent to about 25 weight percent, preferably from about 1 weight percent to about 15 weight percent and more preferably from about 2 weight percent to about 10 weight percent, the percentages based on the total solids of the sizing composition. Greater amounts of stabilizer can be used to provide even greater benefits in mechanical properties so long as the amount does not deleteriously affect the overall performance of the size.

As mentioned above, mixtures stabilizers are useful and preferred for use herein. The mixture of stabilizers can be incorporated into the sizing composition or added in a secondary treatment after the sizing has first been applied to the glass fibers. Examples of other antioxidants that can be used in stabilizer combinations with one or more of the phosphites, hypophosphites, phosphinates and bisulfites are the hindered phenols, diarylamines, thioethers and polymers thereof and mixtures thereof which have been mentioned above. Examples of hindered phenols include triethyleneglycol bis[3-(3'-TERT-butyl-4'-hydroxy-5'methyl phenyl) propanoate] and octadecyl 3,5-bis(1,1-dimethylethyl)-4-hydroxybenzene propanoate commercially available from Ciba-Geigy as IRGANOX 245 and 1076, respectively. Examples of diarylamines include 4-4'di-tert-octyl diphenylamine. Examples of thioethers include di(tridecyl) thiodipropionate with a chemical formula of $S(CH_2CH_2COOC_{13}H_{27})_2$. A suitable commercially available thiodipropionate is that available from Grace from their Evans Chemetics Unit in Waterloo, N.Y., under the product name Evanstab 13. Another example is distearyldithiodipropionate (DSTDP) available from Eastman Chemical Company, Tennessee under the trade designation PA 49M. The amount of the stabilizer mixture is generally in the aforestated range of amounts for the stabilizer.

The coupling agent facilitates adhesion of the organically based sizing composition to the polar glass fiber. Examples of suitable coupling agents include functional organo silanes, transition metal coupling agents, amino containing werner coupling agents and mixtures thereof. Each metal or silicon atom has attached to it one or more hydrolyzable groups which can react with the glass surface resulting in removal of hydroxyl groups, and one or more groups which, for certain film forming polymers containing coreactive functional groups at least, can co-react with the polymer during film-formation. A chemical bridge is thus formed between glass surface and polymer. Examples of hydrolyzable groups include:

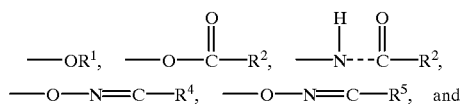

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of groups reactive with film-forming materials include epoxy, glycidoxy, mercapto, cyano, allyl, urethano, halo, isocyanato, ureido, imidazolinyl, vinyl, acrylato, methacrylato, amino or polyamino groups.

Examples of such functional organo silane coupling agents include 3-aminopropyldimethylethoxysilane, gamma-aminopropyltriethoxysilane, gamma-aminopropyltrimethoxysilane, beta-aminoethyltriethoxysilane, N-beta-aminoethylaminopropyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexylethyltrimethoxysilane, ureidopropyltrimethoxysilane, ureidopropyltriethoxysilane, chloropropyltriemethoxysilane, and chloropropyltriethoxysilane.

Amino functional organo silane coupling agents are preferred for use herein and can be hydrolyzed to some degree prior to use by reacting the silane in aqueous medium with an effective amount of a suitable acid, for example, carboxylic acid such as acetic acid.

Non-limiting examples of commercially available functional organo silane coupling agents include epoxy (A-187 gamma-glycidoxypropyltrimethoxysilane), methacrylate (A-174 gamma-methacryloxypropyltriemethoxysilane) and amino (A-1100 gamma-aminopropyltriethoxysilane) silane coupling agents, each of which is commercially available from OSI Specialties, Tarrytown, N.Y. Dow Corning also supplies commercially silanes corresponding to the A-1100 silane and A-187 silane, under the designations Z-6011 and Z-6040 respectively.

Transition metal coupling agents include chrome, titanium and zirconium coupling agents such as, for example, the titanate complexes commercially available from Kenrich Petrochemical Company under the registered trademark Ken-React, for example, Ken-React KR-44, KR-34 and KR-38, the chrome complex commercially available from E.I. DuPont deNemours under the trademark Volan and the zirconate coupling agents also commercially available from Kenrich Petrochemical Company under the Ken-React trademark, for example, Ken-React NZ-97 and LZ-38. The amino-containing werner type coupling agents are complex compounds in which a trivalent nuclear atom such as chromium is coordinated with an organic acid having amino functionality. Other metal chelate and coordinate type coupling agents, known to those skilled in the art can also be used herein.

The coupling agent is generally present in the aqueous sizing composition in an amount from about 1 weight percent to about 30 weight percent, preferably from about 2 weight percent to about 20 weight percent, more preferably from about 5 weight percent to about 15 weight percent, the percentages based on the total solids of the sizing composition.

The film forming material, a chemically modified polyolefin, preferably in the form of an aqueous emulsion, is one which is compatible with polyolefin matrix polymers used in making reinforced composites. The term "chemically-modified polyolefin" refers to acid or acid anhydride modified polyolefins either amorphous or crystalline in type such as those produced by the method explained in U.S. Pat. No. 3,416,990 (Robinson); U.S. Pat. No. 3,437,550 (Paul) and U.S. Pat. No. 3,483,276 (Mahlman). A discussion of these polyolefins, their modification and emulsification can be found in U.S. Pat. No. 5,130,197. An example of a crystalline carboxylated polypropylene polymer useful in the present invention is the Hercoprime® type resin commercially available from Hercules, Inc., Bloomington, Del. An example of a carboxylated amorphous polypropylene polymer is Epolene® E-43 resin commercially available from the Tennessee Eastman Co. Another suitable material is an aqueous emulsion of the Epolene E-43 resin, commercially available from Byk-Cera under the trade designation Aquacer 841 emulsion. CHEMCOR 43C30 amorphous carboxylated polypropylene aqueous emulsion commercially available from Chemical Corporation of America is also suitable. The Aquacer 841 emulsion is the preferred chemically modified polyolefin film forming material which, as mentioned above, is used in amounts to provide a predominant amount of the total solids or non-volatiles of the aqueous size. CHEMCOR 43C30 is also a preferred material. The film forming material is generally present in an amount ranging from about 50 weight percent to about 90 weight percent, preferably about 60 weight percent to about 85 weight percent, more preferably about 64 to about 84 weight percent, the percentages based on the total solids of the sizing composition.

An aqueous polyolefin emulsion can be prepared from either a carboxylated amorphous polyolefin such as the carboxylated amorphous polypropylene polymer, Epolene E43 or a crystalline carboxylated polyolefin such as the crystalline carboxylated polypropylene, Hercoprime G resin, or mixtures. Any of the surfactants or combination of surfactants known to those skilled in the art for emulsifying polyolefins can be used. Examples of suitable surfactants include phenoxy poly(ethyleneoxy)ethanol; octylphenoxy poly(ethyleneoxy) ethanol; nonylphenoxy poly(ethyleneoxy) ethanol as well as other ethoxolated alkyl phenols. An example of a commercially available ethoxylated octylphenoxy ethanol is IGEPAL CA-630 emulsifier commercially available from GAF Corporation of Wayne, N.J. Also suitable as surfactants are polyoxyalkylene block copolymers such as polyoxypropylene-polyoxyethylene copolymer commercially available as PLURONIC™ F-108 from BASF Corporation in Parsippany, N.J.

A further commercially available version of aqueous polyolefin emulsion is the carboxylated amorphous polypropylene from National Starch, Procter Division, sold under the trade designation Protolube RL-5440 polypropylene emulsion. This product has a pH of about 9.5±0.5, a solids content of 32±1, a color ranging from tan to a grey emulsion and is slightly cationic and has a boiling point of approximately 100° C., a specific gravity of 0.98. An infrared spectraphotometric curve and differential scanning colorimeter curve of the RL-5440 emulsion product are presented as FIGS. 3 and 4 of U.S. Pat. No. 5,130,197 and the procedure for obtaining the curves is given therein. optionally, and preferably, the size also contains one or more partial esters of a branched carboxylic acid copolymer as an emulsifier and/or lubricant. The partial ester and its derivatives are polymers with pendant hydrocarbon and ethoxylated ester chains. A commercially available version of a suitable partial ester of a branched carboxylic acid copolymer is that from Akzo Chemie America, of Chicago, under the trade designation Ketjenlube 522 partial ester. (This was formerly sold as Dapral® GE 202 partial ester.) According to the supplier, this material has an average molecular weight of about 20,000, a specific gravity of 1.05 at 25° C., a flash point of 178° C. COC (Cleveland Open Cup) and is a yellowish, viscous liquid with little odor. The supplier reports that this polymer has a comb-like structure and the main chain consists of carbon atoms only. The alkyl branches are hydrophobic and the ester and ether groups are hydrophilic. When present in the sizing composition, the partial ester is generally used in an amount ranging from about 0.1 weight percent to about 10 weight percent preferably from about 0.1 weight percent to about 5 weight percent, more preferably from about 0.5 weight percent to about 2.0 weight percent, the percentages based on the total solids of the sizing composition.

The sizing can also optionally contain other ingredients which are known to those skilled in the art to be useful in fiber glass sizing such as emulsifiers and surfactants, antifoaming agents, biocides, humutants and the like. The sizing can be prepared by any method known to those skilled in the art, and applied to the fibers and/or fillers by any method known in the art. For instance when the glass fibers are produced by a dry chop method it is preferable to have an additional film forming polymer in the size to improve the strand integrity. These film forming polymers are well known to those skilled in the art and will not be discussed here.

Preferably, the aqueous sizing composition of the present invention contains a fluorescent whitening agent, also termed optical brightener, which is added to the size as an aqueous emulsion, dispersion or solution. The fluorescent whitening agent is generally added in an amount ranging from about 0.05 weight percent to about 5.0 weight percent, preferably about 0.25 weight percent to about 1.5 weight percent, the percentages based on the total solids of the sizing composition. A detailed discussion of such a sizing composition containing fluorescent whitening agent can be found in U.S. patent application Ser. No. 08/388,959, entitled "Aqueous Sizing Composition for Glass Fibers Providing Improved Whiteness in Glass Fiber Reinforced Plastics", filed even date herewith.

The carrier for the aqueous sizing composition is water, preferably deionized water. An organic solvent which is water miscible or soluble can also be added along with thioxtropic agents to produce foams and gels of the sizing composition. The carrier is present in an amount effective to give a total solids (non-volatile) content sufficient to provide a viscosity suitable for application to the fibers. Generally, the water is present in an amount sufficient to yield a total solids content in the range of from about 1 to about 50 weight percent and preferably from about 5 to about 20 weight percent. That is, water is present in an amount ranging from about 50 to about 99 weight percent of the sizing composition. In any event the amount of the various components and the amount of water are typically utilized to provide a viscosity not to exceed about 150 centipoise at 20° C. Usually the viscosity of the aqueous sizing composition for application to glass fibers during their formation is in the range of about 1 to about 60 centipoise, preferably about 20 to about 60 centipoise at 20° C. for best results. If the aqueous sizing composition is prepared with thixotropic agents to produce a foam or gel, the viscosity will be such as appropriate for applying foams and gels to the fibers or reinforcement. These parameters are well known to those skilled in the art.

The aqueous sizing composition can be prepared by addition of any of the components simultaneously or sequentially to each other, although the components are preferably prediluted before they are combined and further diluted with water to form the aqueous size. This is to enhance their solubility, dispersibility or emulsifiability.

Any glass fiber suitable for reinforcing can suitably be treated in accordance with the present invention. Glass fibers such as soda lime glasses and borosilicate glasses like "E" glass and "621" type glass are particularly suited for this practice. Also "E" and "621" type glasses formulated with lower amounts of or free of boron and fluorine can be used. Examples of some suitable glass fibers are described at page 29 of *The Manufacturing Technology of Continuous Glass Fibers* by K. L. Lowenstein, published in 1973 by Elsevier Scientific Publishing Company, Library of Congress Card Number 72-97429.

The glass fibers to be treated according to this invention can typically be produced according to the teachings of U.S. Pat. No. 2,133,238. The glass fibers are formed by being drawn at a high rate of speed from molten cones of glass located at the tips of small orifices in one or more bushings of a glass melting device or furnace. Immediately after formation, the filaments are treated with the sizing composition described above.

The application of the sizing to the filaments can occur while they are moving at a speed on the order of 1000 to 20,000 feet per minute (300 to 6100 meters/min) in the immediate vicinity of the hot bushings and the glass furnace in which the glass is melted. The application of sizing to glass fibers is well known in the art and can be accomplished by conventional methods such as a belt applicator, a "kiss-roll" applicator or by spraying. Details of a sizing applicator are shown in U.S. Pat. No. 2,728,972. The amount of sizing deposited on the glass is generally about 0.01 to around 5 weight percent and preferably about 0.3 to about 2.5 to 3 weight percent of the treated glass fiber strand.

After sizing, the glass fibers are gathered into bundles or strands of a plurality of fibers usually by a gathering shoe and/or a strand pulling device as illustrated in U.S. Pat. Nos. 3,292,013 and 4,248,935. Additionally, or alternatively, the fibers, before or after collection into one or more strands, can be attenuated by a chopper which cuts the fibers and/or collected strands into lengths from about a sixteenth (1.6 mm) to about 3 (76.2 mm) inches. The chopped strands can be deposited into a bag or box for ease in handling. The amount of moisture on the wet chopped glass fiber is generally in the range of up to about 20 weight percent. The glass can also be gathered into strands and collected as continuous glass fiber strand into a forming package and subsequently chopped in a remote wet chop process or after drying, in a dry chop process into lengths similar to those of the direct wet chop process. The forming package can be dried to remove residual moisture at room temperature or by oven heating.

Not only do reinforcing glass fibers benefit from treatment with the aforedescribed aqueous sizing composition, but also inorganic fillers sometimes used in reinforced composites would benefit from such treatment. Nonexclusive examples of such inorganic fillers include mica, wollastonite, talc, clay, flaked glass, glass beads and novaculite. Contacting the fillers with the aqueous size is accomplished by spraying, dipping or the like.

The dried glass fibers are used to reinforce polymeric matrices in any of the molding processes known to those skilled in the art utilizing either chopped strand, continuous strand or a mixture thereof. Preferably, the chopped fiber strands are mixed with the matrix polymer resin in a dry powder mixture to produce a homogeneous batch of matrix polymer. The batch can be compression or injection molded to produce the fiber reinforced polymeric part or shaped device. These sized glass fibers are used in molding fiber reinforced polymers such as fiber reinforced polyolefins such as polypropylenes and mixtures of polypropylenes; polyesters such as polyethylenes and polyalkylene terephthalates, including PET and PBT, polyamides such as nylons, polyphenylene oxide, polystyrenics and other similar polar thermoplastic polymers, copolymers, blends and alloys. The sized fibers of the present invention can also be used to reinforce chemically coupled thermoplastics such as chemically coupled polyolefins like polypropylene.

The term "chemically coupled" means a thermoplastic polyolefin such as polypropylene to which has been added an acid modified polyolefin which provides chemical moieties for reaction with the components of the sizing. This acid modified polyolefin chemical coupler is added to the thermoplastic as a physical mixture prior to compounding with the fibers and can be, for example, polypropylene with pendant carboxylic acid groups. These pendant carboxylic acid groups are believed to react with the basic amino groups of the amino silane coupling agent to create a strong bond between the glass to which the silane is attached and the polyolefin compatible chemical coupler. An example of a suitable chemically coupled polyolefin for use with the fibers of this invention is commercially available as PCO-72 from Himont. PCO-72 is a mixture of unmodified polypropylene homopolymer and a small amount of chemically coupled polypropylene homopolymer. A further example of a chemically coupled polypropylene is Exxelor POXI 1015 from Exxon.

The glass fibers of this invention can also be used to reinforce thermoplastics which are not chemically coupled. That is, no chemical coupling agent is added. An example of a suitable non-chemically coupled thermoplastic is commercially available as Profax® 6523 polypropylene from Himont and is a polypropylene homopolymer.

The sized fibers of this invention provide generally good results in both chemically coupled and non-chemically coupled thermoplastics.

PREFERRED EMBODIMENT

The preferred embodiment utilizes glass fibers that are processed by an after dried wet chop method having a dried residue of the size where the fibers have a length of about 1/8" (32 millimeters) to 1/2" (12.7 millimeters). The fibers have conventional filament diameters that can range from around 1 micron to greater than 30 microns but are preferably in the diameter of about 10 to around 16 microns. The preferred ingredients and ranges of amounts are shown below in Table A:

TABLE A

| COMPONENT | WEIGHT PERCENT OF THE SOLIDS |
|---|---|
| Gamma Aminopropyltriethoxysilane | 7.5 to 23.5 |
| Polypropylene emulsion | 64 to 84 |
| sodium hypophosphite | 3.0 to 15 |
| partial ester of branched carboxylic acid copolymer | 0.3 to 2.3 |

The preferred method of preparing the sizing of this invention is as follows, where the amounts are based on the preparation of 100 liters of the size.

To a main mix tank containing 40 liters of deionized water were added 800 grams of acetic acid (80 percent acetic acid) followed by A-1100 gamma-aminopropyltriethoxysilane from Osi Specialities Inc. in an amount of 2.50 kilograms and the mixture stirred at a moderate rate for 10 minutes. About 24.7 kilograms of polypropylene emulsion were added to the main mix tank. To a premix tank containing 10 liters of room temperature water was added 900 grams of sodium hypophosphite, with stirring, until the sodium hypophosphite dissolved, about 10 minutes, and the mixture added to the main mix tank. Then, to a premix tank, containing 10 liters of water at 70 degrees Centigrade was added Dapral® GE 202 partial ester (about 130 grams), the mixture stirred for 10 minutes and added to the main mix tank and diluted to a volume of 100 liters. The size formulated in this manner had a solids level of about 10.0 percent and a pH of 5.0 plus or minus 1.

Glass fibers were sized with a roller applicator and chopped in a wet condition. The fibers were dried and compounded with commercially available chemically coupled polypropylene homopolymer (CCHP) using a counter-rotating extruder at a 30 weight percent glass content. The compounded glass and polypropylene mixture was molded in a 200 ton injection molding unit then tested for strength. The fibers were also compounded and molded with a commercially available non-chemically coupled homopolymeric polypropylene (HP) in the same manner.

The size formulations of Table 1 were prepared in a manner similar to that for the preferred embodiment which is further described at Example 2 in Table 1.

The sizings of Table 1 were each applied to a plurality of glass fibers to prepare a strand construction having 800 filaments per strand where the filaments had a fiber diameter of 13 microns. The strands for each example were wound into separate forming packages. A number of forming packages for each example, between 2 and 12, but preferably 4 were unwound and combined into a strand which passed over an applicator to apply additional moisture and/or sizing before chopping in a wet condition. Usually it is preferred to chop a multitude of strands, usually in the range of around 10 to 15 per chopper. The chopped strand can be either dried directly after chopping or collected and dried by a fluidized bed continuous process dryer.

In Table 1 the second batch of sizing formulations were prepared and along with these another Illustrative Example 1 (Illustrative Example 1B) and another Example 2 (Example 2) were also prepared. These additional formulations are listed as Illustrative Example 1B, Example 2B, and Examples 3–6 in Table 1 and they all employ sodium hypophosphite as the stabilizer or antioxidant. The sizings were applied to glass fibers formed in strand constructions and chopped, compounded, molded and tested in homopolymer polypropylene and chemically coupled polypropylene in a similar manner to that described above for Examples 1 and 2 and 7–9 and tested for initial mechanical properties.

TABLE 1

Sizing Formulations (% of Total Solids)

| | Ill. Ex. 1 | Ex. 1 | Ex. 2 | Ill. Ex. 1B | Ex. 2B | Ex. 3 | Ex. 4 | Ex. 5 | Ex. 6 | Ex. 7 | Ex. 8 | Ex. 9 |
|---|---|---|---|---|---|---|---|---|---|---|---|---|
| A-1100 gamma-aminopropyltriethoxysilane | 21.1 | 21.2 | 21.2 | 21.1 | 21.2 | 15.0 | 15.7 | 7.8 | 19.9 | 21.2 | 21.3 | 21.4 |
| Polypropylene Emulsion | 77.2 | 66.7 | 66.6 | 77.2 | 66.6 | 82.5 | 79.9 | 78.9 | 70.0 | 72.1 | 67.1 | 61.9 |
| Dapral GE 202 Partial Ester Carboxylic Acid Copolymer | 1.7 | 1.3 | 1.3 | 1.7 | 1.3 | 1.3 | 1.3 | 1.3 | 1.3 | 1.3 | 1.3 | 1.3 |
| Sodium Benzene Phosphinate | — | 10.8 | — | — | — | — | — | — | — | — | — | — |
| Sodium Hypophosphite | — | — | 10.8 | — | 10.8 | 8.7 | 3.0 | 11.9 | 8.7 | — | — | — |
| Organic Phosphite Irgasfos 168 Emulsion | — | — | — | — | — | — | — | — | — | 3.6 | 3.6 | 3.6 |
| Hindered Phenol Irganox 1010 Emulsion | — | — | — | — | — | — | — | — | — | 1.8 | 1.8 | 1.8 |
| Thioester Antioxidant - DSTDP | — | — | — | — | — | — | — | — | — | — | 4.9 | 9.9 |
| LOI | 1.00 | 0.80 | 0.98 | — | — | — | — | — | — | 0.97 | — | — |
| Grams of Fuzz | 0 | 0 | 0.03 | 0 | 0 | 0 | 0 | 0 | 0.03 | 0 | 0 | 0 |

The chopped strands for each example were compounded, molded and tested separately in a similar manner in homopolymer polypropylene (12 Mf Himont F30S) and chemically coupled polypropylene (addition of 2.5 percent Exxelor POXI 1015 to the base polypropylene resin).

Compounding was performed to make fiber reinforced polypropylene plastic (FRP) samples by extruding the chopped glass fiber strands with pellets of the matrix polypropylene polymer in a Werner Pfleiderer ZSK 30 (millimeter) twin-screw extruder at a screw speed of 300 rpm and full vacuum. The chopped strands were fed downstream using a vibratory glass strand feeder. The pellets of the matrix polymer and any additional polymer additives were dry blended prior to feeding into the extruder. Injection molding was performed with a Battenfeld CD750 machine at a screw speed of 100 rpm, clamp pressure of 100 bar and back pressure of 35 bar. The samples were molded using an ISO family mold.

The compounds for each example were tested for initial mechanical properties and color. They were also tested for retention of mechanical properties and color after heat-aging at 150° C. for a total of 13 days. The initial mechanical property results are listed in Table 2 and the heat-aging mechanical property results for various times during the 13-day period are listed in Tables 3 and 4.

The tests were conducted in accordance with the following methods for the stated test: Tensile: on a Zwick 1476 Model machine according to ISO 527 using a 100 kiloNewton load at a cross head speed of 2 millimeter (mm)/minute for measurement of modulus and 5 mm/minute for strength measurements, where the sample was held by mechanical wedge grips; Flexural: on A Zwick Model 1474 according to ISO 178 at a cross head speed of 2 mm/minute for modulus and 5 mm/minute for strength using a 3 KiloNewton load with a three-point bending configuration and 64 mm span; Impact: with a Zwick impact tester (pendulum type) according to ISO 179 (Charpy) and ISO 180 (Izod); color: Dr. Lange Colorimeter as a function of color coordinates L, a and b. L is an indicia of whiteness with a larger number being indicative of improved whiteness whereas b is an indicia of yellowness with a smaller number being indicative of less yellowing. The a value corresponds to green and red, and for natural colored thermoplastics is usually between +0.5 and −1.5; and glass content: by first weighing test specimens, burning them to remove any coating and then weighing them afterwards. The difference represents the glass content.

The units in the following tables are SI units utilizing the following abbreviations: MPa=(megapascals); GPa=(gigapascals); J/m=(joules/meter); and kJ/meter2=kilojoules/square meter; (mm)=millimeters; ($\mu$m)=microns; (g/cm3)=grams per cubic centimeter.

In the first part of Table 2 the Illustrative Example 1 was conducted with examples 1–2 and 7–9. In the second part of Table 2, Table 2(B) the Illustrative Example 1B was conducted with examples 2b and 3–6. The formulation of Example 2 as shown in Table 2 resulted in increased mechanical properties in homopolymer relative to the illustrative example. Although the glass content was slightly higher, the tensile strength was 23 percent higher, the flexural strength was 20 percent higher, the unnotched charpy was 30 percent higher and the unnotched Izod was 59 percent higher. The color values indicated a whiter product (higher L value) and less yellow (lower b value). All of the Examples 1–9 gave comparable or higher initial mechanical properties. The results of the mechanical properties in Table 2 for Examples 2B and 3–6 and Illustrative Example 1B show a connection between the amount of sodium hypophosphite in the sizing formulation and the level of mechanical properties. Example 4 had the lowest amount of sodium hypophosphite and also had the lowest level of mechanical properties. Example 5 had the highest amount of sodium hypophosphite and had the highest level of mechanical properties. The mechanical properties for most of the size formulations of Examples 2–9 of Table 1 as shown in Table 2 resulted in equivalent mechanical properties to those obtained for the Illustrative Example 1 formulation.

As shown in Table 3, the specimens were taken from heat-aging at 150° C. at the first, third, sixth, ninth and thirteenth days and tested for tensile and impact properties. Examples 2 and 8 had significantly better heat aging results than the illustrative example without the antioxidant. The product from Example 9 had good results up until the 13th day and then failed to the extent that it was not measurable due to oxidation. The heat-aging properties for the product of Example 9 are in the most part similar to those for Example 8 until the 13th day. Given the similarities in the formulation and the data through nine days, the 13th day value may be suspect. The impact properties (unnotched charpy and unnotched Izod) in homopolymer polypropylene are listed in Table 3. All the examples with antioxidant or stabilizer have superior properties to those of Illustrative Example 1. In unnotched Izod, both the product of Example 8 and Example 2 stood out as being significantly better. The property retention in unnotched charpy and unnotched Izod were slightly different. The unnotched charpy impact test demonstrated with Examples 1–2 and 7–9 significantly better property retention after 13 days than that for Illustrative Example 1. However, the results for Example 2 were slightly better than the others. The unnotched Izod was more differentiating, and Examples 8 and 2 were significantly better than those for Illustrative Example 1 and the other size formulations.

The properties of tensile strength and elongation for chemically coupled polypropylene after heat-aging are listed in Table 4. In chemically coupled polypropylene, three examples, 2, 8 and 9, were significantly better than the results for Illustrative Example 1. Impact retention of the chemically coupled polypropylene with heat-aging is also shown in Table 4. Similar results are observed where the results for Examples 2, 8 and 9 providing the best results on heat aging.

From the data in Tables 1–4, the size and sized glass fibers and polypropylene reinforcement articles of the present invention provides significant improvement in heat aging for the reinforced polypropylene and significant improvements in homopolymer mechanical properties of the polypropylene and significant improvement in color of both the homopolymer and chemically coupled polypropylene in terms of higher L values (more white) and lower b values (less yellow).

TABLE 2

Mechanical and Color Properties

| | Ill. Ex. 1 | Ex. 1 | Ex. 2 | Ex. 7 | Ex. 8 | Ex. 9 |
|---|---|---|---|---|---|---|
| Himont F30s Homopolymer Polypropylene 12 Melt Flow | | | | | | |
| Tensile Strength (MPa) | 66 | 73 | 81 | 70 | 71 | 68 |
| Tensile Elongation (%) | 1.5 | 1.6 | 1.9 | 1.5 | 1.5 | 1.5 |
| Flexural Strength (MPa) | 86 | 97 | 103 | 91 | 93 | 89 |
| Flexural Modulus (GPa) | 5.3 | 5.7 | 5.6 | 5.5 | 5.7 | 5.5 |
| Unnotched Charpy (kJ/m$^2$) | 11.4 | 11.4 | 14.8 | 10.7 | 11.4 | 10.9 |
| Unnotched Izod (kJ/m$^2$) | 19.5 | 20.9 | 31.1 | 21.0 | 18.7 | 18.7 |
| Glass Content (%) | 30.6 | 31.6 | 31.9 | 31.0 | 31.8 | 30.6 |
| Color Values L | 57.8 | 62.6 | 59.7 | 59.8 | 59.1 | 60.1 |
| Color Values a | −2.5 | −2.4 | −2.5 | −2.5 | −2.2 | −2.5 |
| Color Values b | 5.5 | 5.9 | 2.6 | 6.2 | 6.2 | 6.3 |
| Himont F30s Plus 2.5% Exxelor 1015 (Chemically Coupled) | | | | | | |
| Tensile Strength (MPa) | 101 | 100 | 96 | 102 | 103 | 101 |
| Tensile Elongation (%) | 2.9 | 2.8 | 3.0 | 3.0 | 3.0 | 3.0 |
| Flexural Strength (MPa) | 143 | 139 | 134 | 145 | 144 | 141 |
| Flexural Modulus (GPa) | 5.8 | 6.0 | 5.8 | 5.9 | 5.9 | 5.8 |
| Unnotched Charpy (kJ/m$^2$) | 32.7 | 30.9 | 30.2 | 33.6 | 32.8 | 33.3 |
| Unnotched Izod (kJ/m$^2$) | 59.9 | 56.8 | 57.2 | 60.8 | 63.9 | 63.3 |
| Glass Content (%) | 31.3 | 31.9 | 28.2 | 31.5 | 31.7 | 30.8 |
| Color Values L | 56.6 | 58.4 | 57.4 | 57.4 | 55.8 | 55.0 |
| Color Values a | −2.3 | −2.8 | −2.4 | −2.2 | −2.7 | −2.5 |
| Color Values b | 6.7 | 5.5 | 2.3 | 7.1 | 6.9 | 6.4 |

| | Ill. Ex. 1B | Ex. 2B | Ex. 3 | Ex. 4 | Ex. 5 | Ex. 6 |
|---|---|---|---|---|---|---|
| Himont F30s Homopolymer Polypropylene 12 Melt Flow | | | | | | |
| Tensile Strength (MPa) | 70 | 80 | 81 | 76 | 82 | 79 |
| Tensile Elongation (%) | 1.6 | 2.0 | 1.8 | 1.7 | 1.8 | 1.7 |
| Flexural Strength (MPa) | 92 | 107 | 108 | 99 | 109 | 105 |
| Flexural Modulus (GPa) | 5.4 | 5.4 | 5.6 | 5.6 | 5.6 | 5.6 |
| Unnotched Charpy (kJ/m$^2$) | 11.1 | 16.1 | 13.9 | 12.2 | 13.8 | 13.3 |
| Unnotched Izod (kJ/m$^2$) | 20.2 | 29.1 | 26.2 | 22.8 | 27.5 | 27.1 |
| Glass Content (%) | 30.7 | 31.7 | 31.3 | 31.6 | 31.4 | 31.1 |
| Color Values L | 58.63 | 58.0 | 59.3 | 59.6 | 57.8 | 60.4 |
| Color Values a | −2.5 | −2.2 | −2.1 | −2.3 | −2.0 | −2.4 |
| Color Values b | 4.9 | 1.6 | 2.6 | 3.9 | 2.0 | 2.7 |
| Himont F30s Plus 2.5% Exxelor 1015 (Chemically Coupled) | | | | | | |
| Tensile Strength (MPa) | 102 | 94 | 99 | 103 | 96 | 101 |
| Tensile Elongation (%) | 3.0 | 3.0 | 2.9 | 2.9 | 2.7 | 3.0 |
| Flexural Strength (MPa) | 140 | 132 | 137 | 141 | 132 | 138 |
| Flexural Modulus (GPa) | 5.5 | 5.7 | 5.7 | 5.6 | 5.6 | 5.6 |
| Unnotched Charpy (kJ/m$^2$) | 32.3 | 29.1 | 31.0 | 31.5 | 26.6 | 31.7 |
| Unnotched Izod (kJ/m$^2$) | 63.6 | 57.4 | 60.3 | 58.8 | 50.5 | 63.4 |
| Glass Content (%) | 31.4 | 31.4 | 31.7 | 32.1 | 31.8 | 31.7 |
| Color Values L | 55.3 | 56.5 | 56.2 | 56.2 | 56.7 | 56.1 |
| Color Values a | −2.1 | −2.1 | −2.0 | −2.2 | −2.2 | −2.2 |
| Color Values b | 5.6 | 1.9 | 2.3 | 3.7 | 1.8 | 2.4 |

TABLE 3

| | Ill. Example | Ex. 7 | Ex. 8 | Ex. 9 | Ex. 1 | Ex. 2 |
|---|---|---|---|---|---|---|
| Heat Aging Tensile Strength Retention of Homopolymer PP after Exposure to 150° C. | | | | | | |
| Tensile Strength (MPa) | | | | | | |
| Initial | 66 | 70 | 71 | 68 | 73 | 81 |
| 1 Day | 58 | 62 | 62 | 60 | 63 | 68 |
| 3 Days | 58 | 61 | 61 | 60 | 63 | 66 |
| 6 Days | 46 | 60 | 61 | 60 | 61 | 65 |
| 9 Days | 35 | 54 | 60 | 60 | 51 | 64 |
| 13 Days | 20 | 33 | 60 | — | 33 | 64 |
| Tensile Elongation (%) | | | | | | |
| Initial | 1.5 | 1.5 | 1.5 | 1.5 | 1.6 | 1.9 |
| 1 Day | 1.5 | 1.4 | 1.4 | 1.4 | 1.3 | 1.4 |
| 3 Days | 1.6 | 1.4 | 1.4 | 1.4 | 1.3 | 1.3 |
| 6 Days | 0.7 | 1.4 | 1.4 | 1.4 | 1.3 | 1.3 |
| 9 Days | 0.5 | 1.1 | 1.4 | 1.4 | 0.9 | 1.3 |
| 13 Days | 0.4 | 0.6 | 1.4 | — | 0.6 | 1.4 |
| Heat Aging Unnotched Charpy and Izod Impact Retention of Homopolymer PP After Exposure to 150° C. | | | | | | |
| Unnotched Charpy (kJ/m$^2$) | | | | | | |
| Initial | 11.4 | 10.7 | 11.4 | 10.9 | 11.4 | 14.8 |
| 1 Day | 10.5 | 9.9 | 10.1 | 9.6 | 10.0 | 10.5 |
| 3 Days | 10.3 | 10.1 | 10.1 | 10.2 | 10.2 | 10.5 |
| 6 Days | 10.9 | 10.1 | 9.8 | 10.1 | 10.2 | 10.6 |
| 9 Days | 9.9 | 10.4 | 9.9 | 11.0 | 9.9 | 10.2 |
| 13 Days | 4.0 | 8.7 | 9.9 | 10.3 | 8.7 | 11.0 |
| Unnotched Izod (kJ/m$^2$) | | | | | | |
| Initial | 19.5 | 21.0 | 18.7 | 18.7 | 20.9 | 31.1 |
| 1 Day | 19.5 | 18.8 | 18.4 | 17.7 | 17.1 | 21.9 |
| 3 Days | 18.1 | 17.3 | 17.6 | 19.4 | 15.8 | 21.6 |
| 6 Days | 18.0 | 17.7 | 17.7 | 16.8 | 17.2 | 21.0 |
| 9 Days | 14.6 | 18.8 | 17.6 | 18.5 | 15.8 | 19.0 |
| 13 Days | 3.7 | 7.3 | 17.4 | 8.1 | 6.7 | 20.2 |

TABLE 4

Heat Aging Tensile Strength Retention
of Chemically Coupled PP after Exposure to 150° C.

| | Ill. Ex. 1 | Ex. 7 | Ex. 8 | Ex. 9 | Ex. 1 | Ex. 2 |
|---|---|---|---|---|---|---|
| Tensile Strength (MPa) | | | | | | |
| Initial | 101 | 102 | 103 | 101 | 100 | 96 |
| 1 Day | 95 | 97 | 99 | 97 | 96 | 95 |
| 3 Days | 86 | 90 | 92 | 91 | 92 | 91 |
| 6 Days | 80 | 85 | 88 | 87 | 89 | 89 |
| 9 Days | 60 | 71 | 85 | 82 | 65 | 88 |
| 13 Days | 15 | 28 | 82 | 79 | 47 | 82 |
| Tensile Elongation (%) | | | | | | |
| Initial | 2.9 | 3.0 | 3.0 | 3.0 | 2.8 | 3.0 |
| 1 Day | 2.2 | 2.2 | 2.2 | 2.2 | 2.2 | 2.3 |
| 3 Days | 1.9 | 1.9 | 2.0 | 2.0 | 2.0 | 2.1 |
| 6 Days | 1.7 | 1.8 | 1.9 | 1.9 | 1.9 | 2.1 |
| 9 Days | 1.2 | 1.4 | 1.8 | 1.6 | 1.2 | 2.0 |
| 13 Days | 0.3 | 0.7 | 1.7 | 1.7 | 0.8 | 1.8 |

Heat Aging Properties Unnotched
Charpy and Izod Chemically Coupled PP 150° C.

| | Ill. Ex. 1 | Ex. 7 | Ex. 8 | Ex. 9 | Ex. 1 | Ex. 2 |
|---|---|---|---|---|---|---|
| Unnotched Charpy (kJ/m$^2$) | | | | | | |
| Initial | 32.7 | 33.6 | 32.8 | 33.3 | 30.9 | 30.2 |
| 1 Day | 25.1 | 25.4 | 26.2 | 26.5 | 25.6 | 25.8 |
| 3 Days | 22.6 | 23.2 | 22.1 | 23.9 | 21.2 | 24.2 |
| 6 Days | 20.4 | 22.2 | 20.6 | 21.6 | 20.4 | 23.6 |
| 9 Days | 9.3 | 18.9 | 19.1 | 19.7 | 19.0 | 21.8 |
| 13 Days | 4.4 | 7.1 | 19.2 | 20.6 | 15.6 | 19.9 |
| Unnotched Izod (kJ/m$^2$) | | | | | | |
| Initial | 59.9 | 60.8 | 63.9 | 63.3 | 56.8 | 57.2 |
| 1 Day | 44.6 | 47.3 | 45.1 | 48.1 | 45.6 | 46.4 |
| 3 Days | 42.1 | 40.5 | 42.6 | 44.0 | 42.1 | 44.2 |
| 6 Days | 34.0 | 39.3 | 39.7 | 38.8 | 38.5 | 40.3 |
| 9 Days | 23.2 | 33.4 | 34.2 | 30.0 | 33.6 | 39.0 |
| 13 Days | 5.2 | 9.1 | 32.7 | 34.0 | 16.9 | 36.4 |

We claim:

1. An aqueous sizing composition for glass fibers, comprising:
   a) a coupling agent;
   b) a chemically modified polyolefin film forming material;
   c) a stabilizer selected from the group consisting of:
      i) phosphinates selected from the group consisting of alkali metal phosphinates, alkaline earth metal phosphinates, ammonium phosphinate, organic phosphinates and mixtures thereof;
      ii) phosphonites selected from the group consisting of alkali metal phosphonites, alkaline earth metal phosphonites, ammonium phosphonite, organic phosphonites and mixtures thereof;
      iii) phosphites selected from the group consisting of alkali metal phosphites, alkaline earth metal phosphites, ammonium phosphite, organic phosphites and mixtures thereof;
      iv) hypophosphites selected from the group consisting of alkali metal hypophosphites, alkaline earth metal hypophosphites, ammonium hypophosphite and mixtures thereof;
      v) sulfites selected from the group consisting of alkali metal sulfites, alkaline earth metal sulfites, ammonium sulfite and mixtures thereof;
      vi) bisulfites selected from the group consisting of alkali metal bisulfites, alkaline earth metal bisulfites, ammonium bisulfite and mixtures thereof; and
      vii) mixture of one or more of the stabilizers of i through vi with an antioxidant selected from the group consisting of hindered phenols, diarylamines, thioethers and mixtures thereof.

2. The aqueous sizing composition of claim 1 wherein the chemically modified polyolefin film forming material is a carboxylic acid modified polyolefin.

3. The aqueous sizing composition of claim 2 wherein the carboxylic acid modified polyolefin is in the form of an aqueous emulsion.

4. The aqueous sizing composition of claim 2 wherein the polyolefin is polypropylene.

5. The aqueous sizing composition of claim 4 wherein the carboxylic acid modified polypropylene is selected from the group consisting of crystalline, carboxylic acid modified polypropylene and amorphous, carboxylic acid modified polypropylene.

6. The aqueous sizing composition of claim 3 wherein the emulsion is an oil-in-water emulsion and the sizing composition contains from about 50 weight percent to about 90 weight percent of the carboxylic acid modified polyolefin, the percentages based on total solids of the sizing composition.

7. The aqueous sizing composition of claim 1 wherein the stabilizer is a hypophosphite selected from the group consisting of alkali metal hypophosphites and ammonium hypophosphite.

8. The aqueous sizing composition of claim 7 wherein the stabilizer is an alkali metal hypophosphite selected from the group consisting of sodium hypophosphite and potassium hypophosphite.

9. The aqueous sizing composition of claim 8 wherein the stabilizer is sodium hypophosphite.

10. The aqueous sizing of claim 1 wherein the stabilizer is a phosphinate which is sodium benzene phosphinate.

11. The aqueous sizing composition of claim 1 wherein the coupling agent is an organofunctional silane coupling agent which is an aminofunctional organosilane selected from the group consisting of gamma-aminopropyltriethoxy silane, gamma-aminopropyltrimethoxy silane and hydrolysis products thereof.

12. The aqueous sizing composition of claim 1 wherein the stabilizer is a mixture of stabilizers selected from the group consisting of a) a mixture of organic phosphites with hindered phenols and b) a mixture of organic phosphites, hindered phenols with thioethers, said mixture present in the size in an amount ranging from about 2 weight percent to about 20 weight percent, the percentages based on total solids of the sizing composition.

13. The aqueous sizing composition of claim 1 further comprising a partial ester of a branched carboxylic acid copolymer.

14. The aqueous sizing composition of claim 11 further comprising a carboxylic acid in an amount sufficient to hydrolyze the silane coupling agent.

15. The aqueous sizing composition of claim 1 further comprising a water miscible or soluble organic solvent.

16. An aqueous sizing composition for glass fibers, comprising:
   a) an aminofunctional organosilane coupling agent and hydrolysis products thereof in an amount ranging from about 5 weight percent to about 25 weight percent;
   b) an aqueous emulsion of a carboxylic acid modified polypropylene film forming material in an amount ranging from about 50 weight percent to about 90 weight percent; and
   c) a stabilizer, in an amount ranging from about 2 weight percent to about 20 weight percent, selected from the group consisting of:

i) phosphinates selected from the group consisting of alkali metal phosphinates, alkaline earth metal phosphinates, ammonium phosphinate, organic phosphinates and mixtures thereof;
ii) phosphonites selected from the group consisting of alkali metal phosphonites, alkaline earth metal phosphonites, ammonium phosphonite, organic phosphonites and mixtures thereof;
iii) phosphites selected from the group consisting of alkali metal phosphites, alkaline earth metal phosphites, ammonium phosphite, organic phosphites and mixtures thereof;
iv) hypophosphites selected from the group consisting of alkali metal hypophosphites, alkaline earth metal hypophosphites, ammonium hypophosphite and mixtures thereof;
v) sulfites selected from the group consisting of alkali metal sulfites, alkaline earth metal sulfites, ammonium sulfite and mixtures thereof.
vi) bisulfites selected from the group consisting of alkali metal bisulfites, alkaline earth metal bisulfites, ammonium bisulfite and mixtures thereof; and
vii) mixture of one or more of the stabilizers of i through vi with an antioxidant selected from the group consisting of hindered phenols, diarylamines, thioethers and mixtures thereof, the percentages based on the weight of total solids of the aqueous sizing composition.

17. The aqueous sizing composition of claim 16 wherein stabilizer is sodium hypophosphite in an amount ranging from about 3 weight percent to about 15 weight percent.

18. The aqueous sizing composition of claim 16 wherein the amount of coupling agent ranges from about 7.5 weight percent to about 23.5 weight percent.

19. The aqueous sizing composition of claim 16 wherein the amount of film forming material ranges from about 64 weight percent to about 84 weight percent.

20. The aqueous sizing composition of claim 16 further comprising a partial ester of a branched carboxylic acid copolymer in an amount ranging from about 0.3 weight percent to about 2.3 weight percent.

21. A plurality of glass fibers having applied thereon a moisture reduced residue of the aqueous sizing composition of claim 1 in an amount ranging from about 0.3 weight percent to about 3 weight percent, the percentages based on the weight of the glass, on a loss on ignition basis.

22. A glass fiber reinforced polyolefin composite wherein the glass fiber reinforcement is a plurality of glass fibers according to claim 21.

23. The glass fiber reinforced polyolefin composite of claim 22 wherein the plurality of glass fibers are chopped fibers and the polyolefin is polypropylene.

24. The glass fiber reinforced composite of claim 23 wherein the polyolefin is a blend of a homopolymer of unmodified polypropylene and chemically coupled polypropylene.

* * * * *